(12) United States Patent
Dethier et al.

(10) Patent No.: US 10,788,022 B2
(45) Date of Patent: Sep. 29, 2020

(54) TIGHT STRUCTURE FOR EXTERNAL SOLAR RECEIVER IN A TOWER OF A CONCENTRATING SOLAR POWER PLANT

(71) Applicant: COCKERILL MAINTENANCE & INGENIERIE S.A., Seraing (BE)

(72) Inventors: Alfred Dethier, Sprimont (BE); Luc Fairon, Manhay (BE); Vincenzo Morreale, Anthisnes (BE); Stephane Winand, Angleur (BE)

(73) Assignee: COCKERILL MAINTENANCE & INGENIERIE S.A., Seraing (BE)

( * ) Notice: Subject to any disclaimer, the term of this patent is extended or adjusted under 35 U.S.C. 154(b) by 614 days.

(21) Appl. No.: 15/521,316

(22) PCT Filed: Oct. 19, 2015

(86) PCT No.: PCT/EP2015/074119
§ 371 (c)(1),
(2) Date: Apr. 24, 2017

(87) PCT Pub. No.: WO2016/066461
PCT Pub. Date: May 6, 2016

(65) Prior Publication Data
US 2017/0306932 A1    Oct. 26, 2017

(30) Foreign Application Priority Data

Oct. 28, 2014 (BE) .................................. 2014/5036

(51) Int. Cl.
*F03G 6/06* (2006.01)
*F22B 1/00* (2006.01)
(Continued)

(52) U.S. Cl.
CPC .............. *F03G 6/065* (2013.01); *F22B 1/006* (2013.01); *F22B 37/201* (2013.01);
(Continued)

(58) Field of Classification Search
None
See application file for complete search history.

(56) References Cited

U.S. PATENT DOCUMENTS 3,030,937 A * 4/1962 Witzke .................... F22B 37/10
122/6 A
5,482,233 A     1/1996 Marko et al.
(Continued)

FOREIGN PATENT DOCUMENTS

EP        0106687 A2    4/1984
WO   WO 2010048578 A1   4/2010

*Primary Examiner* — Avinash A Savani
*Assistant Examiner* — Elizabeth M. May
(74) *Attorney, Agent, or Firm* — Leydig, Voit & Mayer, Ltd.

(57) ABSTRACT

An external solar receiver, for a concentrating thermodynamic solar power plant of the type with a tower and heliostat field, has a wind tight modular inner structure, also called "casing," and a plurality of heat exchanger tube receiver panels fastened to that inner structure. Each panel has a plurality of metal boxes supporting the heat exchanger tubes and assembled to one another by assembly means allowing the disassembly, each box being covered with thermal insulation via an anchor. The tubes are secured to the boxes by a removable and floating connector.

8 Claims, 6 Drawing Sheets

(51) Int. Cl.
 *F22B 37/20* (2006.01)
 *F24S 10/25* (2018.01)
 *F24S 20/20* (2018.01)
 *F24S 40/80* (2018.01)
 *F24S 10/70* (2018.01)
 *F24S 20/00* (2018.01)

(52) U.S. Cl.
 CPC ............ *F22B 37/208* (2013.01); *F24S 10/25* (2018.05); *F24S 20/20* (2018.05); *F24S 40/80* (2018.05); *F24S 10/70* (2018.05); *F24S 2020/10* (2018.05); *Y02E 10/41* (2013.01); *Y02E 10/46* (2013.01)

(56) References Cited

U.S. PATENT DOCUMENTS

| | | | |
|---|---|---|---|
| 6,305,128 B1* | 10/2001 | Horner | B60P 3/205 |
| | | | 160/351 |
| 8,162,569 B2* | 4/2012 | Kennedy | E21D 21/00 |
| | | | 299/11 |
| 2010/0199980 A1 | 8/2010 | Ricci et al. | |
| 2012/0031094 A1* | 2/2012 | de Bruijn | F03G 6/065 |
| | | | 60/641.11 |
| 2013/0118482 A1 | 5/2013 | Albrecht et al. | |

* cited by examiner

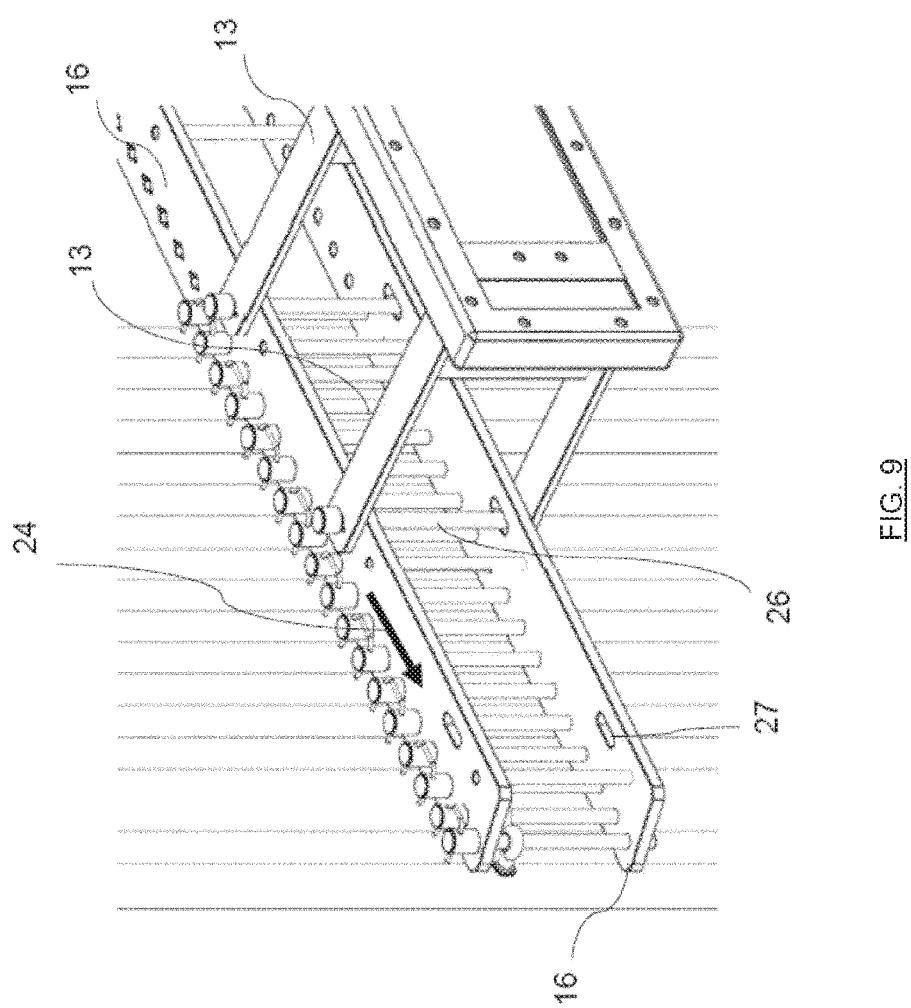

TIGHT STRUCTURE FOR EXTERNAL SOLAR RECEIVER IN A TOWER OF A CONCENTRATING SOLAR POWER PLANT

CROSS-REFERENCE TO RELATED APPLICATIONS

This application is a U.S. national stage application under 35 U.S.C. 0371 of International Application No. PCT/EP2015/074119, filed on Oct. 19, 2015, and claims benefit to Belgian Patent Application No. 2014/5036, filed on Oct. 28, 2014. The International Application was published in French on May 6, 2016, as WO 2016/066461 A1 under PCT Article 21 (2).

FIELD

The present invention relates to the technical field of concentrating solar power plants (CSP), and more particularly tower solar power plants, and still more particularly those with an external solar receiver.

BACKGROUND

In a tower-type concentrating solar power plant, the solar radiation is reflected by a series of mirrors, called heliostats, toward a central solar receiver situated on a tower, which transfers the energy from the solar radiation to a heat transfer fluid that will heat up and be usable to produce electricity.

The heliostats are provided with two rotation mechanisms making it possible to track the sun and always return the solar flow toward a given point, irrespective of the time of day and season.

The solar receiver is installed at the apex of the tower so as to receive the solar radiation from all of the heliostats without a given heliostat hindering the reflection of the flow produced by an adjacent heliostat.

The hot fluid generated in the solar receiver may be high pressure and high temperature steam generated from feed water. The steam can then be used directly in a steam turbine driving an electricity generator.

The hot fluid can also be a mixture of salts serving as a heat transfer fluid able to be stored on the ground in large quantities and partially used to produce steam and generate electricity. It is therefore possible to separate solar energy collection and electricity production.

The solar receiver installed at the apex of the tower may be of the cavity or external type. In the first case, the cavities are inwardly provided with two panels, capturing the solar rays, and the cavity reduces radiation losses. In the case of the external type, the panels capturing the solar radiation are installed outside and all around the tower. The losses are slightly greater relative to the cavity system, but it is easier to concentrate the solar radiation therein, the mean thermal flow being significantly higher and the surface of the panels being greatly reduced for a same power.

In the external solution, the planar panels are juxtaposed to form a straight prism with a regular polygonal base. Depending on the installed powers, the prism with a polygonal base may have a variable number of faces, for example from 4 to 32.

The common practice according to the state of the art is to fasten the aforementioned panels to a stationary structure. Each of these panels can then expand freely under the effect of the temperature increase following the capture of the solar energy.

In order to allow easy maintenance and for example to offer the possibility of replacing a single tube of the panel, the tubes are not welded to one another, but simply juxtaposed, with very little play between them. Each tube can then be maintained individually in order to withstand wind and earthquake forces if necessary. However, the other unwelded tubes allow wind to pass, and this requires a tight partition in the background to prevent the incident wind, heated by the hot tubes, from penetrating the body of the tower, which is an area visited for maintenance, inspection and operational purposes. Furthermore, the inside of the tower comprises sensitive electrical and electronic equipment that generally cannot withstand high temperatures. This tight partition will also be called "casing" in the rest of the description. For information, the temperature behind the support structure of the solar panels inside the tower can be 40-50° C., while the outside temperature at the panels and their direct support structure can be 500-850° C.

Document WO 2010/048578 discloses a heat exchanger with a solar receiver assembled in the warehouse having an arrangement of heat transfer surfaces and a structurally interconnected vertical steam/water separator at the fluids thereof. A vertical support structure is provided to support the vertical separator and the heat transfer surfaces. The vertical support structure is supported from underneath, while the vertical steam/water separator and the heat transfer surfaces of the heat exchanger are supported from above from the vertical support structure. The vertical support structure provides structural support and rigidity for the heat exchanger and a means by which the heat exchanger can be grasped and lifted to be placed in a desired location.

In this installation, horizontal reinforcing ribs or beams are attached to the solar tube panels. All of the panels are supported from above and suspended from the support structure inside the receiver. Each tube panel includes interconnecting plates. Each plate is connected by two connecting rods or bars, pivoting at their ends using pins, to a tab that is attached to a flexion support that in turn is attached by structural steel to the columns comprising the vertical support structure of the receiver. The pivoting bars allow a certain rotation of the solar panels and therefore make it possible to react the average thermal expansion of the supported panels. This system provides horizontal stability to the tube panels while allowing the tubes a free and independent vertical extension, with reduced tension on the tubes. However, the system allows a stress-free expansion of the tubes vertically, but not horizontally.

Document U.S. Pat. No. 5,482,233 discloses a removable support clamp for solar receiver panel tubes. The tube support clamp is mounted sliding on a guide rod, the clamp comprising a stiffener with a key inserted in a slot of the guide rod and two lobes that grip the guide rod. One key point of this concept is an easy assembly and disassembly without requiring access to the back side of the panels. This clamp system once again allows a stress-free expansion of the tubes vertically, but not horizontally.

Document US 2013/0118482 A1 discloses a solar receiver including a multi-sided central assembly with wing assemblies extending from corners thereof. The central assembly includes one-sided heat absorption panels, while the wing assemblies use two-sided heat absorption panels. Stiffener structures run across the exposed faces of the various heat absorption panels.

Document US 2010/0199980 A1 discloses a boiler for a solar receiver including a first receiver panel having a plurality of substantially parallel boiler tubes fluidly connecting an inlet header of the panel to an outlet header of the panel. A second receiver panel has a plurality of substantially parallel boiler tubes fluidly connecting an inlet header of the panel to an outlet header of the panel. The boiler tubes of the second receiver panel are substantially parallel to the boiler tubes of the first receiver panel. The first and second receiver panels are separated by a gap. A panel expansion joint is connected to the first and second receiver panels across the gap, wherein the panel expansion joint is configured and adapted to allow for lengthwise thermal expansion and contraction of the receiver panels along the boiler tubes, and to allow for lateral thermal expansion and contraction of the receiver panels toward and away from one another, while blocking solar radiation through the gap.

Document EP 0 106 687 A2 discloses a tube panel having both vapor generating tubes and superheating tubes. At least two parallel vapor generating tubes are spaced apart to provide a gap there between. A superheating tube is contiguous with each of the two vapor generating tubes and is disposed rearwardly of the gap to span the gap for receiving radiation energy from forward of the gap to assure a proper distribution of incident heat flux among the vapor generating and superheating tubes while eliminating the need for complex and expensive vibration support members for the vapor generating tubes. A support member is disposed rearwardly of and adjacent the superheating tube and extends transversely to the longitudinal direction thereof, and the vapor generating tubes are supported by tie bars connected between the respective vapor generating tubes and the respective support member to effectively support the superheating tube between the vapor generating tubes and the support member. Moreover the support members of the superheating tubes are connected through the insulation by brackets to structural "I" beams. The brackets are provided with rollers which are able to roll along the flanges of the "I" beam owing to the axial thermal expansion of the tubes. The movement of the tubes under thermal expansion effect thus feeds back onto the internal structure through thermal insulation.

SUMMARY

An aspect of the invention provides an external solar receiver for a concentrating thermodynamic solar power plant of the type with a tower and heliostat field, the tower comprising: a wind tight modular inner structure, as a casing; and a plurality of heat exchanger tube receiver panels fastened to that inner structure, wherein each panel includes a plurality of metal boxes supporting the heat exchanger tubes and assembled to one another by assemblers configured to allow disassembly. Each metal box is covered with thermal insulation via an anchor. The heat exchanger tubes are secured to the boxes by a removable and floating connector, allowing thermal expansion of the heat exchanger tubes and thermal expansion of a part of their support subject to a high temperature both in a longitudinal direction of the heat exchanger tubes and in transverse directions thereto. Each heat exchanger tube includes several welded eyelets, distributed over a height of the heat exchanger tube, able, under axial thermal expansion of the heat exchanger tube, and configured to have a key slid therein, wherein the key is fastened to the metal box through the thermal insulation by support bars, so that movement of the heat exchanger tubes under expansion, substantially in the longitudinal direction and along a plane of the panel, occurs outside the thermal insulation.

BRIEF DESCRIPTION OF THE FIGURES

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 9 a detailed view of the mechanical support system for the solar tubes, according to the invention, ensuring its maintenance and guidance and reacting wind forces.

DETAILED DESCRIPTION

Figure 1:
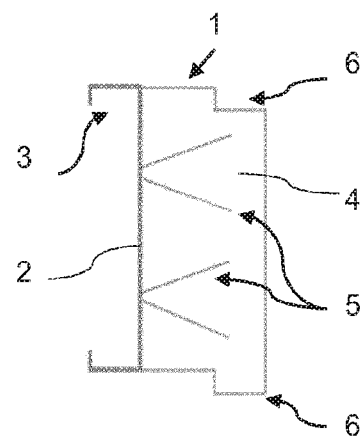
FIG. 1 a diagrammatic sectional view of an individual box making up the modular casing according to the present invention.

An aspect of the present invention provides a solution for the design of a casing of an external solar tower receiver so that the latter can perform the following functions:
  wind tightness and an effective thermal barrier,
  insulation between the "tube" side, which is very hot, and the inner "tower" side, which must be kept at an acceptable temperature for staff and special equipment, and
  maximum reduction of heat losses so as not to damage the performance.

The casing preferably also allow wind or earthquake forces exerted on the solar tube panels and the wall of the casing itself to be reacted.

The casing preferably also be designed for an assembly of the tubes facilitating their maintenance or replacement.

Lastly, the casing preferably allow vertical and horizontal expansions of the two panels and be designed to avoid mechanical movements of support elements through the insulation.

An aspect of the present invention provides an external solar receiver for a concentrating thermodynamic solar power plant of the type with a tower and heliostat field, said tower comprising a wind tight modular inner structure, also called "casing", and a plurality of heat exchanger tube receiver panels fastened to that inner structure, each panel comprising a plurality of metal boxes supporting the heat exchanger tubes and assembled to one another by assembly means allowing the disassembly, each box being covered with thermal insulation via an anchoring means, the tubes being secured to the boxes by a removable and floating connecting means, i.e., allowing the thermal expansion of the tubes and of the part of their support subject to the high temperature both in the longitudinal direction of the tubes and in the transverse directions thereto, characterized in that each tube is provided with several welded eyelets, distributed over the height of the tube, able, under the effect of the axial thermal expansion of the tube, to slide in a key, which in turn is fastened to the box through the thermal insulation by support bars, so that the movement of the tubes under the effect of the expansion, essentially in the longitudinal direction and along the plane of the panel, is done outside the thermal insulation. Thus, it is the support structure that allows the expansion of the receiver panel without any movement through or in the insulation.

According to preferred embodiments of the invention, the solar receiver further comprises at least one of the following features, or any suitable combination thereof:

the metal boxes are in a single piece and made up of a rectangular metal sheet bent in a "U" shape on each of its sides, the corners of each box being welded;

the thermal insulation is a block with a rectangular section corresponding to that of the boxes and including, on each of its sides, a male or female baffle so as to be able to be assembled with an adjacent insulation block including additional baffles on its sides;

different boxes with the thermal insulation are assembled with slight play facilitating their disassembly, a removable sealing means being provided between the boxes to ensure wind tightness;

the removable sealing means includes a seal mounted crushed by bolting on the one hand between the flanges formed by the U-shaped ends of two adjacent boxes and on the other hand a companion flange or an H-shaped profile;

the key is provided with two diametrically opposite lugs able to cooperate with two hollows formed in each bar, so as to be able to lock the key by rotation by a quarter revolution, a thin bent metal sheet being provided to prevent rotation of the key around itself;

a slightly bent staple able to be mounted on two adjacent keys is provided to ensure the locking of said keys;

the eyelets welded on the tube have a saddle-shaped base;

the tubes are connected to one another via their corresponding keys by lateral intermediate support plates that provide the junction between the bars and the tubes;

the bars are connected to the support plates using axes that are inserted into oblong holes of the bars.

A specific technical solution provided by the present invention lies not only in the requested functions for the purposes of the invention, but also in a configuration that can easily be disassembled from the rear, i.e., from the inside of the tower, accessible to maintenance staff, through modular elements easy for the assembly staff to manipulate. This results in easy access to the rear of the tubes, and therefore the possibility of an inspection and maintenance of the tubes, which are the most stressed part of the solar receiver.

FIG. 1 shows a box 1 of the modular casing subdivided into a plurality of boxes 1 with a preferred size of approximately 1 to 2 m². Each box 1 is made up of a metal sheet 2 bent into a "U" shape 3 on each of its four sides. The corners of each box are welded, forming a rigid assembly.

Figure 3:
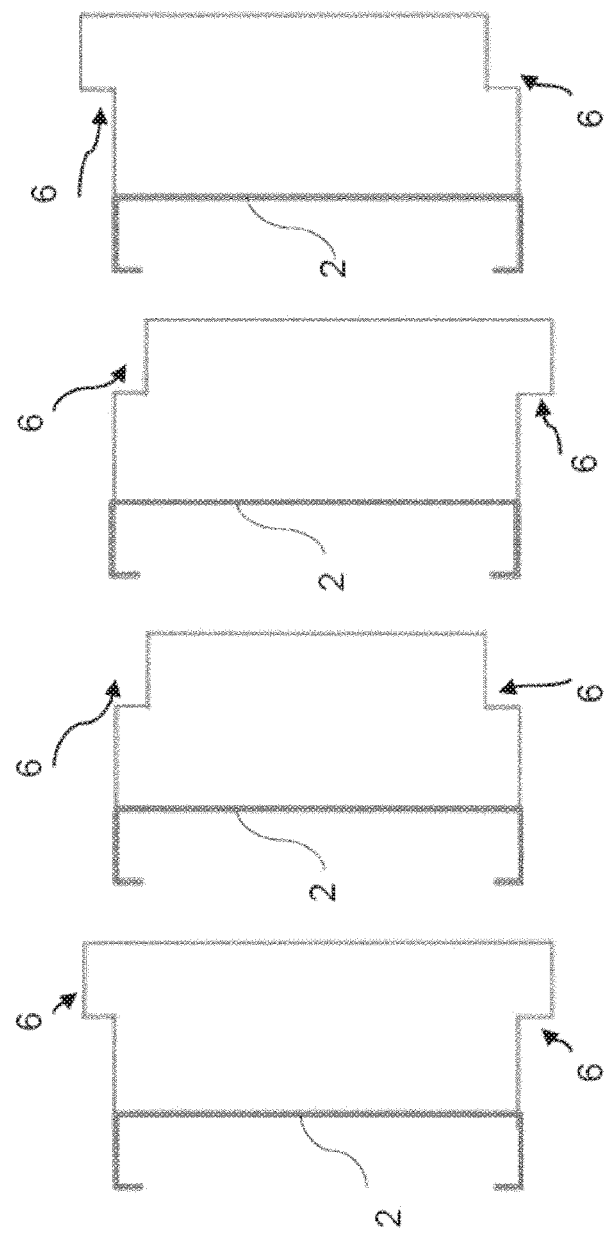
FIG. 3 a diagrammatic sectional view of several embodiments of the box according to FIG. 1 with a male or female baffling of the thermal insulation anchored on the metal sheet, on either side (in the drawing: top side and bottom side)

A specific thermal insulation 4 is anchored on the metal sheet 2, on the high-temperature side, using an anchoring system 5 known by those skilled in the art. Baffles 6 are arranged in the insulation 4 so as to provide a thermal barrier between the adjacent boxes 1, while avoiding solar radiation leaks through the panels. Depending on the location of the box 1 in the assembly of the solar receiver, the baffling 6 will be male and/or female on either side, as shown in FIG. 3.

Figure 2:
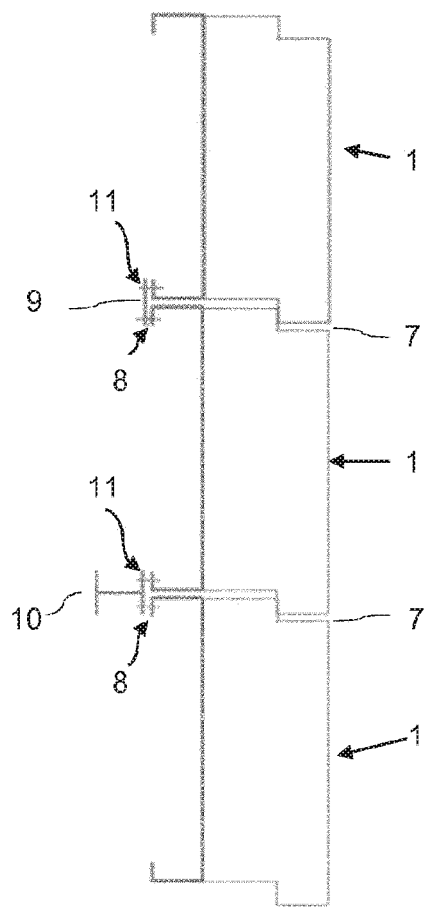
FIG. 2 a diagrammatic sectional view of several boxes (three in the case at hand) according to claim 1, assembled to one another with slight play and connecting means between the boxes ensuring wind tightness.

As shown in FIG. 2, the boxes 1 are then assembled to one another with slight play 7 and the wind tightness is provided either by a seal 8 and a companion flange 9, or by a seal 8 and an H-shaped profile 10. In the latter case, the H-shaped profile 10 will react the wind and earthquake loads and retransmit those forces to the main framework (as for example shown in FIG. 8). The companion flange 9 or the H-shaped profile 10 are assembled by a removable assembly means, preferably assembled using bolts 11, on corresponding pre-pierced flanges of the box, by crushing the sealing gasket 8. The assembly play 7 between the boxes further allows easy disassembly.

Figure 4:
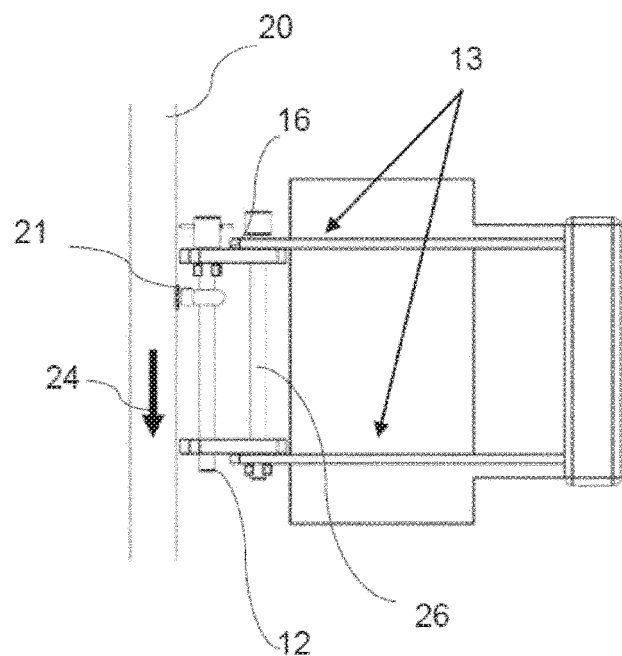
FIG. 4 an elevation view of the device for fastening an individual tube to a box, comprising bars and a key, as well as an eyelet welded on the tube, according to one embodiment of the present invention.

As shown in FIG. 4, the transmission of the wind and earthquake forces acting on the tubes 20 toward the sheet metal 2 of the casing 1 and the H-shaped profiles 10 is done by an eyelet 21 welded on the tube 20 and sliding along a key 12, allowing the axial thermal expansion of the tube 20, but limiting its lateral movements. All of the tubes 20 are supported individually.

Figure 5:
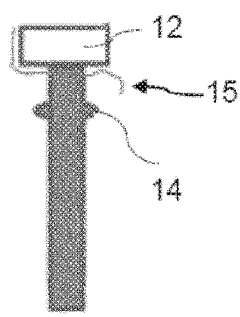
FIG. 5 a detailed view of the key of FIG. 4 with a first solution for locking the key at the bars.

As also shown in FIG. 4, each key 12 is maintained at the casing 1, 2 by two bars 13 preferably made in the form of flat sections. Owing to two lugs 14 arranged on the key 12, and two hollows arranged in the bar 13, the key 12 will be kept in place, even in case of vertical force oriented upward, rotating the latter by a quarter revolution. A thin bent metal sheet 15 will prevent the rotation of the key 12 so that the lugs do not find themselves across from the assembly hollows (see FIG. 5). Other details of the connection are shown in FIG. 9 (see below).

Figure 6:
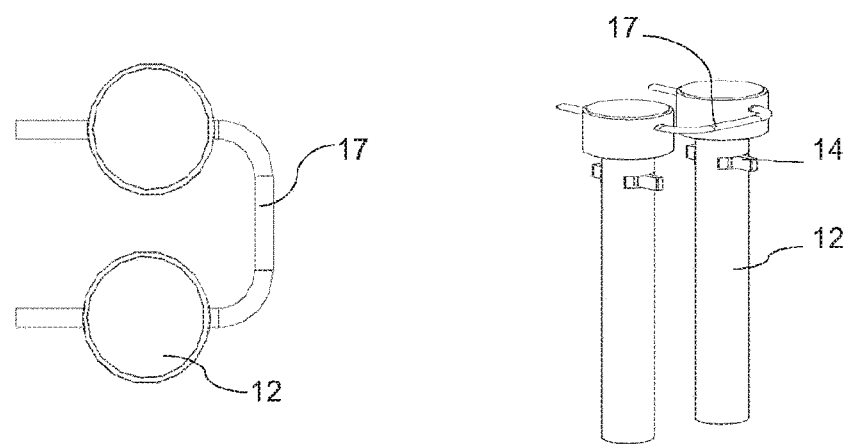
FIG. 6 a detailed view of the key of FIG. 4 with a second solution for locking the key at the bars.

As shown in FIG. 6, another locking solution of the key 12 consists of using a staple 17 mounted on two consecutive or adjacent keys 12 slightly bent so as to keep it in place.

Figure 7:
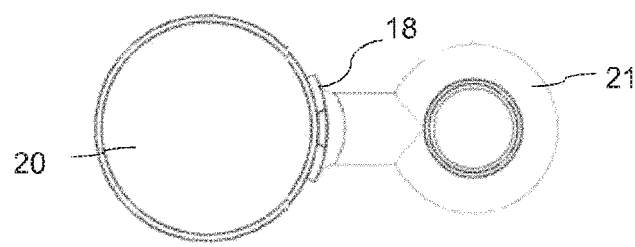
FIG. 7 a planar view of one particular embodiment of the eyelet welded on the tube according to FIG. 4.

As shown in FIG. 7, the eyelet 11 welded on the tube 20 will also advantageously have a particular shape with a saddle-shaped base 18, allowing easy welding on the tube while better distributing the forces on the tube, thus minimizing stresses.

Figure 8:
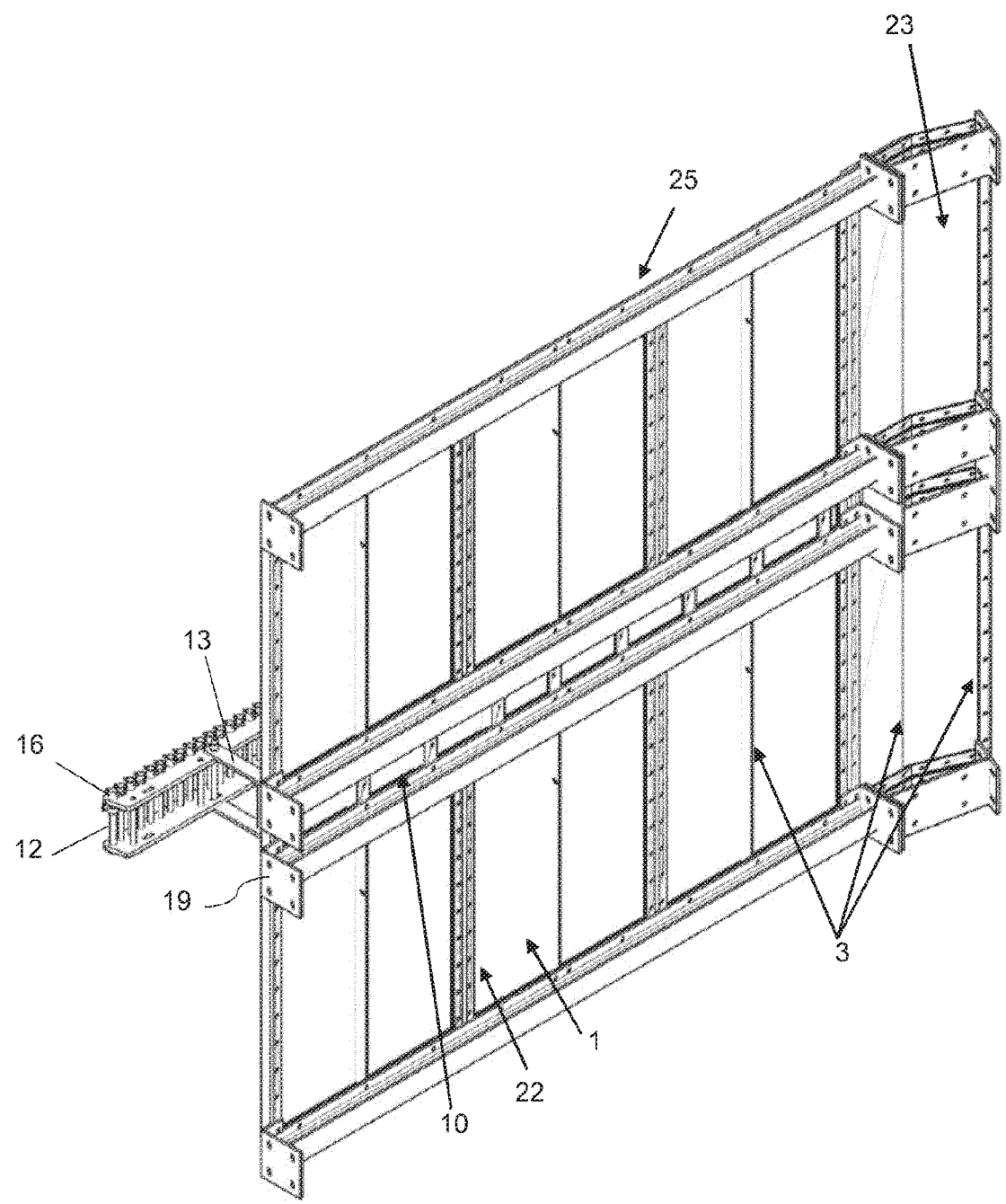
FIG. 8 a perspective view of the assembly of a solar receiving panel comprising several modular boxes according to the invention, seen from behind, i.e., from the cold side.

FIG. 8 shows a realistic embodiment for the assembly of the casing of a panel 25 seen from behind, and in particular with two horizontal series of boxes 1 assembled with horizontal H-shaped profiles 10 for wind tightness and beams 19 that react wind forces. FIG. 8 also shows a corner box 23. Like the panels, the corner box 23 is bolted on the wind beams 19. The thermal insulation is not shown.

As shown in FIGS. 4 and 9, the flat portions 13 themselves are retained by the casing 1, 2 by forming a floating assembly, which allows the flat portions 13 to expand over their lengths, the latter also being subject to a high temperature on the outer side. FIG. 9 also shows that all of the tubes 20 and therefore the associated keys 12 are advantageously laterally connected by metal support plates 16 that serve as a junction between the tubes 20 and the support flats 13. Also advantageously, two flat portions 13 are connected to support plates 16 using axes 26 that are inserted into oblong holes 27 of the flat portions 13, which allows the horizontal expansion of the panels 25.

According to an aspect of the invention, the tube panels can move vertically, but also horizontally under the effect of the thermal expansion. Thus, the support plates 16 make it possible to react the horizontal expansion of the tubes, by expanding with the tubes, since those plates 16 are also subjected to high temperatures. Furthermore, the connections by rods and oblong holes of the flat portions 13 and the support plates 16 also facilitate the horizontal expansion of the panels.

The design of an aspect of the system allows an independent assembly of the tubes, which facilitates the maintenance and/or replacement. The saddle welding of the tubes to the eyelets makes it possible to distribute the forces on the tube, preferably with a thickness of the edge of the saddle in the same order of magnitude as the thickness of the tube.

Another advantage of an aspect of the invention is that this expansion of the tubes and their direct support structure, and the resulting movement, is done in large part outside the installation (unlike the connecting rod system described in WO 2010/048578, for example).

Lastly, the different modular boxes can be coated with their insulation either in the plant, or on the assembly site. The boxes are sized to be able to be manipulated by two people, if applicable equipped with appropriate handling tools (maximum weight of approximately 150 kg).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE SYMBOLS 1. box
2. metal sheet
3. U-shaped bend of the metal sheet (flange)
4. thermal insulation
5. anchoring
6. baffle
7. play between adjacent boxes
8. seal
9. companion flange
10. H-shaped profile
11. bolt
12. removable key
13. support bar (flat)
14. lug
15. anti-rotation bent metal sheet
16. intermediate lateral plate
17. staple
18. saddle base
19. wind beam
20. exchanger tube
21. eyelet welded on tube
22. stiffener
23. corner box
24. movement of the tubes by expansion
25. exchanger tube panel
26. connecting axis
27. oblong hole

The invention claimed is:

1. An external solar receiver for a concentrating thermodynamic solar power plant of the type with a tower and heliostat field, the tower comprising:
   a wind tight modular inner structure, as a casing; and
   a plurality of heat exchanger tube receiver panels fastened to that inner structure,
   wherein each panel includes a plurality of metal boxes supporting the heat exchanger tubes, the plurality of metal boxes being removably fastened together by one or more removable fastening devices,
   wherein each metal box is covered with thermal insulation via an anchor,
   wherein the heat exchanger tubes are secured to the boxes by a removable and floating connector, allowing thermal expansion of the heat exchanger tubes and thermal expansion of a part of their support subject to a high temperature both in a longitudinal direction of the heat exchanger tubes and in transverse directions thereto,
   wherein each heat exchanger tube includes several welded eyelets distributed over a height of the heat exchanger tube, each of the several welded eyelets being configured to slide along a respective key under axial thermal expansion of the heat exchanger tube, and
   wherein each respective key is fastened to the metal box through the thermal insulation by support bars, so that movement of the heat exchanger tubes under expansion, substantially in the longitudinal direction and along a plane of the panel, occurs outside the thermal insulation,
   the solar receiver further comprising:
   different boxes including the thermal insulation, assembled with slight play facilitating their disassembly; and
   a removable seal provided between the different boxes to ensure wind tightness,
   wherein the removable seal includes a seal mounted crushed by bolting between flanges formed by U-shaped ends of two adjacent boxes and by a companion flange or an H-shaped profile.

2. The solar receiver of claim 1, wherein each metal box comprises a single piece rectangular metal sheet bent in a "U" shape on each side of the metal box, and
   wherein corners of each box are welded.

3. The solar receiver of claim 1, wherein the thermal insulation is a block with a rectangular section corresponding to that of the metal boxes and including, on each of its sides, a male or female baffle, so as to be able to be assembled with an adjacent insulation block including additional baffles on its sides.

4. The solar receiver of claim 1, further comprising:
   a slightly bent staple configured to be mounted on two adjacent keys so as to ensure the locking of the keys.

5. The solar receiver of claim 1, wherein the eyelets welded on the heat exchanger tube include a saddle-shaped base.

6. The solar receiver of claim 1, wherein the heat exchanger tubes are connected to one another via their corresponding keys by lateral intermediate support plates providing a junction between the bars and the tubes.

7. The solar receiver of claim 6, wherein the bars are connected to the support plates using axes that are inserted into oblong holes of the support plates.

8. An external solar receiver for a concentrating thermodynamic solar power plant of the type with a tower and heliostat field, the tower comprising:

a wind tight modular inner structure, as a casing; and a plurality of heat exchanger tube receiver panels fastened to that inner structure, wherein each panel includes a plurality of metal boxes supporting the heat exchanger tubes, the plurality of metal boxes being removably fastened together by one or more removable fastening devices, wherein each metal box is covered with thermal insulation via an anchor, wherein the heat exchanger tubes are secured to the boxes by a removable and floating connector, allowing thermal expansion of the heat exchanger tubes and thermal expansion of a part of their support subject to a high temperature both in a longitudinal direction of the heat exchanger tubes and in transverse directions thereto, wherein each heat exchanger tube includes several welded eyelets distributed over a height of the heat exchanger tube, each of the several welded eyelets being configured to slide along a respective key under axial thermal expansion of the heat exchanger tube, and wherein each respective key is fastened to the metal box through the thermal insulation by support bars, so that movement of the heat exchanger tubes under expansion, substantially in the longitudinal direction and along a plane of the panel, occurs outside the thermal insulation, the solar receiver further comprising a slightly bent staple configured to be mounted on two adjacent keys so as to ensure the locking of the keys.

* * * * *